Sept. 26, 1950 H. F. MAYER 2,523,537
FREQUENCY CONTROL SYSTEM
Filed May 21, 1949
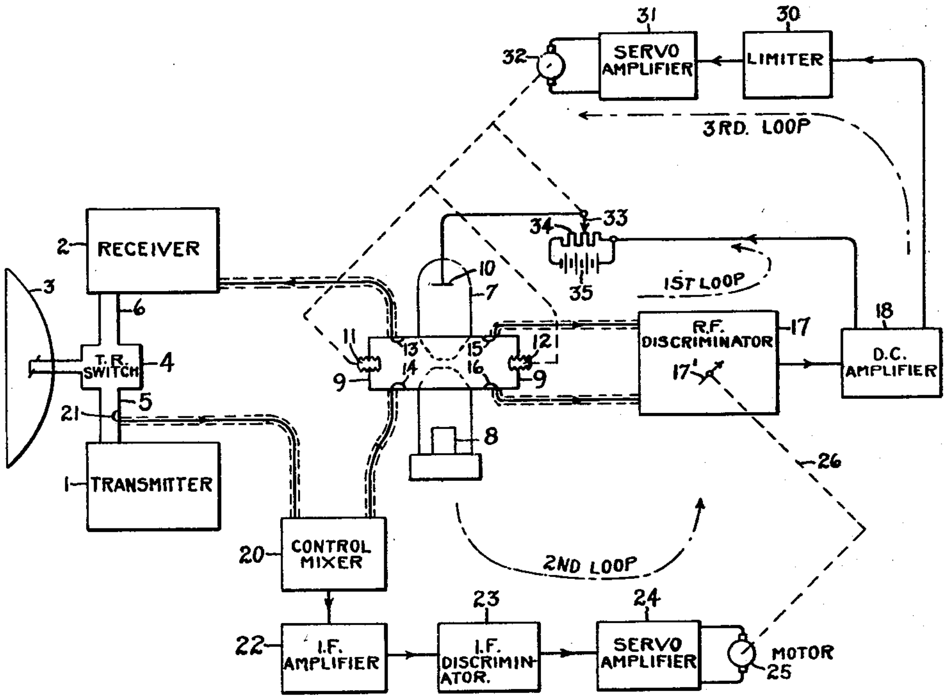
Inventor:
Harry F. Mayer,
by Merton D. Morse
His Attorney.

Patented Sept. 26, 1950

2,523,537

UNITED STATES PATENT OFFICE 2,523,537

FREQUENCY CONTROL SYSTEM

Harry F. Mayer, Baldwinsville, N. Y., assignor to General Electric Company, a corporation of New York Application May 21, 1949, Serial No. 94,613

6 Claims. (Cl. 343—13)

This invention relates generally to frequency control systems, and more particularly, to a system for controlling the frequency of operation of a local oscillator in radar apparatus wherein a high order of stability is required.

In the moving target indication system of radar identification, it is essential that a high order of stability be maintained in the frequency of operation of the local oscillator. In such a system, the identification of moving targets is dependent upon the comparison of pulse echoes in successive transmissions. Accordingly, the order of stability must be such that there is essentially no phase shift between the transmitted pulses of radio frequency energy and the local oscillator frequency during the period between successive pulses.

The local oscillator is normally a velocity-modulated electron discharge device or tube having a resonant cavity and a plurality of coupling loops for deriving energy therefrom. The frequency of operation of this type of tube may be controlled by varying the dimensions of the resonant cavity through mechanical means such as bellows or plungers. In the type of velocity-modulated tube commonly known as a reflex Klystron, the electron stream is reflected through a cavity by means of a reflector electrode, and the frequency of operation may also be controlled, to a certain extent, by the potential impressed on this electrode.

In the prior art, local oscillator stability of the order required for a moving target indication radar system has been achieved by means of a radio frequency discriminator, having an input circuit coupled to the resonant cavity of the reflex Klystron, and providing an output signal which is utilized to control the potential supplied to the reflector electrode. Such a radio frequency discriminator may consist of a pair of resonant cavities tuned to slightly different frequencies, and having their output circuits connected in opposition through a pair of crystal rectifiers. The output of each crystal is then a unidirectional voltage, and, providing the frequency of the energy supplied to both cavities of the discriminator is a mean of the resonant frequencies of the cavities, the outputs of the crystals are equal in magnitude. Since these outputs are combined in opposition, the discriminator output voltage is then zero. If the frequency of the local oscillator deviates from the mean frequency of the discriminator, it will have an output voltage of a polarity dependent upon the direction of the deviation and of an amplitude dependent upon its extent. This output voltage is then amplified through suitable means and utilized to control the reflector voltage of the Klystron. Such a control system constitutes a frequency control loop and may be sufficient to assure a high order of frequency stability. However, since the frequency of the local oscillator must be related to that of the transmitter to provide a constant difference frequency, a second control loop may be utilized to tune the discriminator so as to maintain a constant difference frequency or intermediate frequency.

A system of the above-mentioned type, although it may be effective in maintaining a high order of stability in a local oscillator, is restricted in its operating range. It may compensate adequately for frequency variations within a narrow range, but it cannot be utilized to permit tracking of the local oscillator with the transmitter when the frequency of operation of the transmitter is subjected to a substantial shift.

Accordingly, it is an object of this invention to provide a frequency control system for insuring, in the local oscillator of a radar system, a high order of frequency stability between successive pulses, and for permitting, at the same time, large changes in frequency of operation of the whole system.

A further object of this invention is to provide a frequency control system for the local oscillator of a radar system, comprising a fast response control loop for insuring a high order of stability in the time interval between successive pulses, and a slow response control loop for extending the range of the fast response loop.

For further objects and advantages and for a better understanding of the invention, attention is now directed to the following description and accompanying drawings, and also to the appended claims in which the features of the invention believed to be novel are more particularly pointed out.

The single figure of the drawing is a schematic diagram, in block form, of a radar system suitable for moving target indication, and comprising a frequency control system embodying my invention.

Referring to the drawing, there is shown a radar system comprising a transmitter 1, a receiver 2, and a common reflector antenna 3. The antenna is utilized for both transmitting and receiving, and is coupled to a transmit-receive switch 4, which is in turn connected to the transmitter and to the receiver through wave-guide sections 5 and 6, respectively.

The receiver is of the superheterodyne type, and a reflex Klystron tube 7 operates as a local source of high frequency oscillations for the receiver. The reflex Klystron 7 comprises an electron gun 8 situated in an evacuated glass envelope on one side of a tuning cavity 9, and a reflector electrode 10 located in the glass envelope on the opposite side of the cavity. The electron gun 8 comprises a plurality of suitable electrodes, and these are provided with operating potentials through connections which are not shown in the drawing. The resonant frequency of the tuning cavity may be varied by screwing plugs 11 and 12 in or out of the cavity wall, so as to vary the physical dimensions of the cavity. Coupling loops 13, 14, 15, and 16 permit energy to be drawn from the tuning cavity and supplied, through suitable conductors, to the various utilization circuits.

Coupling loop 13 is utilized to supply energy from the tuning cavity to the receiver 2. Coupling loops 15 and 16 are connected to a radio frequency discriminator 17, which may be a microwave equivalent of the well known frequency discriminators used at lower frequencies. Discriminator 17 may contain a pair of resonant cavities tuned to slightly different frequencies, these cavities being adjustable as indicated by the arrow 17'. Since the specific design of discriminator 17 does not form part of my invention, its construction is not illustrated in the drawing and will not be described in detail. However, complete information thereon is readily available in the literature of the art. Specifically, such microwave discriminators are described in the book Technique of Microwave Measurements, edited by Carol E. Montgomery, volume 11 of the Massachusetts Institute of Technology, Radiation Laboratory Series. (See pages 58 to 66 first edition, 1947, McGraw-Hill Book Company, Inc., New York.)

Each of the cavities in discriminator 17 has an output circuit containing a crystal rectifier, connected so that the resultant output voltage of the discriminator combines both crystal output voltages in opposition. Accordingly, when the frequency of the signal supplied to both cavities of discriminator 17 is the mean of the resonant frequency of each cavity, the output voltages of the crystal rectifiers are equal, and the resultant output voltage is zero. If the frequency of the input voltage varies from the mean frequency, the output of one crystal rectifier increases, while that of the other decreases. The resultant output voltage is a unidirectional voltage of a polarity and amplitude dependent upon the direction and the extent of the shift in the local oscillator frequency from the mean frequency of the discriminator.

The output voltage from discriminator 17 is amplified through a polarity sensitive or direct current amplifier 18, and utilized as a control voltage on reflector electrode 10 of Klystron tube 7.

To correlate the local oscillator frequency with that of the transmitter, so as to maintain a constant frequency difference, thereby insuring a constant intermediate frequency, a second control loop is provided for tuning discriminator 17. This second loop comprises a control mixer 20 which is provided with energy from the local oscillator through coupling loop 14, and with energy from the transmitter through a coupling loop 21 located in wave guide section 5, between the transmit-receive switch and the transmitter. The output voltage of control mixer 20 is of an intermediate frequency equal to the difference in frequency of the input voltages. This voltage is amplified in an intermediate frequency amplifier 22 and then supplied to an intermediate frequency discriminator 23. Discriminator 23 is of the well known type utilized in commercial frequency modulation receivers, and provides a unidirectional output voltage varying from zero to a positive or negative value, depending upon the sense and extent of the shift in the frequency of the input voltage from the discriminator tuning point. This unidirectional output voltage is supplied to a servo-amplifier 24 whose output circuit is connected to a motor 25. The servo-amplifier causes the motor 25 to rotate in one direction when the voltage supplied to it is of one polarity, and in the opposite direction when this voltage is of the opposite polarity. Motor 25 is mechanically coupled to tuning element 17' of discriminator 17, as indicated by dotted line 26.

In operation, the stability of oscillation of the local oscillator is maintained by the first frequency control loop comprising discriminator 17 and amplifier 18. The resonant cavities in discriminator 17 have very high energy storage factors or Q's, and amplifier 18 has a high amplification factor so that a high order of frequency stability is insured between successive pulses.

The second control loop comprising control mixer 20, intermediate frequency amplifier 22, discriminator 23, and servo-amplifier 24 responds to a slow drift of the local oscillator or of the transmitter which causes a change in the intermediate frequency. It compensates for any such drift through the correction which it applies to the tuning of the resonant cavities of discriminator 17. Thus, if the transmitter slowly drifted to a higher frequency so that the intermediate frequency changed, motor 25 would vary the tuning of discriminator 17 to compensate for this change. The actual frequency correction in the local oscillator would then be effected through the first control loop by a suitable change in the control voltage applied to reflector electrode 10.

The control system, as described, suffers from the defect that it is very limited in its range of frequency correction. Varying the potential on the reflector electrode permits only a slight range of frequency correction. Also, the range of optimum operation is even narrower, because the amplitude of the oscillations decreases when the potential on the reflector electrode is subjected to a large deviation from the normal operating value. Accordingly, if the frequency of operation of the transmitter is shifted appreciably, the tuning plugs 11 and 12 must be relocated to provide a new mean frequency of operation for the local oscillator, about which the first control loop may exercise its compensating effect.

In accordance with my invention, the range of frequency control of the first loop is extended by means of an auxiliary or third control loop which operates in parallel with the first control loop to vary the setting of the tuning plugs 11 and 12, and also to apply a correcting potential to the reflector electrode 10, so as to maintain Klystron tube 7 in its optimum state of operation.

The third control loop comprises a limiter 30 whose input circuit is connected to amplifier 18, a servo-amplifier 31 having its input circuit connected to the limiter, and a motor 32 connected to the output circuit of servo-amplifier 31. Motor 32 is mechanically coupled to plugs 11 and 12, and also to the contact arm 33, of a resistance 34, across whose terminals a battery 35 is connected. The moving contact arm 33 and the positive side of the potentiometer 34 are serially connected in the circuit from reflector electrode 10 to amplifier 18.

The limiter 30 allows a signal to pass through to servo-amplifier 31 when the voltage applied to its input circuit exceeds a predetermined amplitude, and motor 32 thereupon operates to tune cavity 9 of the Klystron tube. When the voltage applied does not exceed this predetermined amplitude, no signal is transmitted and motor 32 remains quiescent. Thus, there is a considerable dead space or non-responsive range in the operation of the third control loop. As long as an incipient frequency variation is not of an amplitude to exceed the limits of this range, the third control loop remains quiescent, and frequency control is maintained by the first loop operating through the control potential on reflector electrode 10.

The operation of the system when the transmitter is tuned to a new frequency is as follows. As soon as the transmitter frequency changes, a new intermediate frequency results and a voltage is produced at the output terminal of discriminator 23. Thereupon, the second control loop operates and motor 25 starts tuning discriminator 17 to a new frequency. As this discriminator is tuned to a new frequency, a voltage is produced in its output circuit which is amplified through amplifier 18 and supplied to the reflector electrode 10 of Klystron tube 7, thereby changing the local oscillator frequency so as to keep it almost exactly in step with the variation in the center frequency of discriminator 17.

When the output voltage from discriminator 17 attains a predetermined value, a signal is passed through limiter 30 to the servo-amplifier 31, which puts the third control loop into operation. Motor 32 thereupon rotates, and by appropriate movement of lugs 11 and 12, tunes tuning cavity 9 towards the new frequency and, similarly, by the movement of contact arm 33 on potentiometer 34, corrects the unidirectional voltage on reflector 10 so as to maintain Klystron tube 7 in its optimum state of oscillation.

Thus these operations tend to bring the frequency of oscillation of the Klystron tube into correspondence with the new frequency of discriminator 17, whose output voltage accordingly, decreases. When the output voltage of discriminator 17 falls below the value necessary to transmit a signal through limiter 30, the auxiliary loop ceases its operation, and frequency stability is maintained through the first control loop.

It will be noted that there are two control loops working to achieve the same object, namely, the first control loop which varies the instantaneous voltage on reflector electrode 10, and the third control loop which varies the tuning of cavity 9 and also the unidirectional voltage applied to reflector electrode 10. These two control loops would normally have a tendency toward instability. However, this does not occur, since the time-constant of the first loop is much shorter than that of the third. In other words, the first loop is entirely electronic in its operation and responds very quickly, whereas the third loop is partly mechanical and responds more slowly. Also the fact that the third loop contains a limiter introduces a dead space or non-responsive range into its operation and likewise insures stability.

Thus my invention provides a frequency control system having one control loop insuring a high order of stability during successive pulses, and an auxiliary or third control loop which extends the normal range of the first loop. The first loop is quick-acting and operates from a sharply tuned circuit through a polarity sensitive amplifier having a high frequency response. This insures that the frequency of oscillation of the local oscillator does not vary between successive pulses. On the other hand, the third control loop comprises a mechanical apparatus which has of necessity a slow response. However, since the third loop operates only to determine the setting or range within which the first loop will operate, the fact that its response is slow does not diminish the order of stability provided by the first loop. The third loop does, however, extend greatly the range of frequencies over which the first loop may exercise its control. Thus my invention provides a frequency control system for a local oscillator in a radar system, which insures a high order of frequency stablility between successive pulses, and which has, in addition, a very wide range of frequency control.

While a specific embodiment has been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States, is:

1. A frequency control apparatus for a radar system of the type including a transmitter, a superheterodyne receiver, and an oscillator supplying said receiver with a voltage of a local frequency for converting signals of the transmitted frequency to an intermediate frequency, said oscillator having a first and a second frequency control element and being adapted to respond quickly, over a narrow frequency range, to signals applied to said first element, and to respond slowly, over a wide frequency range, to signals applied to said second element, comprising a first frequency control loop having a tuneable discriminator connected to said oscillator for providing a control voltage varying in accordance with the deviation of said local frequency from the center frequency of said discriminator and means for applying said control voltage as a signal to said first element, a second frequency control loop for varying the center frequency of said discriminator in accordance with the deviation of said intermediate frequency from a predetermined value, and a third frequency control loop operating from the control voltage from said discriminator to provide a signal to said second element, said third loop having a longer time constant than said first loop.

2. A frequency control apparatus for a radar system of the type including a transmitter, a superheterodyne receiver, and an oscillator supplying said receiver with a voltage of a local frequency for converting signals of the transmitted frequency to an intermediate frequency, said oscillator having a first and a second frequency control element and being adapted to respond quickly, over a narrow frequency range, to signals applied to said first element, and to respond slowly, over a wide frequency range, to signals applied to said second element, comprising a first frequency control loop having a tuneable discriminator connected to said oscillator for providing a control voltage varying in accordance with the deviation of said local frequency from the center frequency of said discriminator and means for applying said control voltage as a signal to said first element, a second frequency control loop for varying the center frequency of said discriminator in accordance with the deviation of said intermediate frequency from a predetermined value, and a third frequency control loop, operating from the control voltage from said discriminator, and comprising a limiter adapted to pass a signal when said control voltage exceeds a predetermined value, thereby providing a dead space in the operation of said third loop, and means to apply said last named signal to said second element, said third loop having a longer time-constant than said first loop.

3. A frequency control apparatus for a radar system of the type including a transmitter, a superheterodyne receiver and an oscillator supplying said receiver with a voltage of a local frequency for converting signals of the transmitted frequency to an intermediate frequency, said oscillator comprising a velocity modulated tube having an electrode adapted to provide a fast-acting frequency control over a narrow range in response to signals applied thereto, and a tuning cavity containing an adjustable portion adapted to provide a slow-acting frequency control over a wide range, comprising a first frequency control loop having a tuneable discriminator connected to said oscillator for providing a control voltage varying in accordance with the deviation of said local frequency from the center frequency of said discriminator and means for amplifying said control voltage and applying it to said electrode, a second frequency control loop for varying the center frequency of said discriminator in accordance with the deviation of said intermediate frequency from a predetermined value, and a third frequency control loop operating from the control voltage from said discriminator, and containing means for acting on said adjustable portion, said third loop having a longer time-constant than said first loop.

4. A frequency control apparatus for a radar system of the type including a transmitter, a superheterodyne receiver and an oscillator supplying said receiver with a voltage of a local frequency for converting signals of the transmitted frequency to an intermediate frequency, said oscillator comprising a velocity modulated tube having an electrode adapted to provide a fast-acting frequency control over a narrow range in response to signals applied thereto, and a tuning cavity containing an adjustable portion adapted to provide a slow-acting frequency control over a wide range, comprising a first frequency control loop having a tuneable discriminator connected to said oscillator for providing a control voltage varying in accordance with the deviation of said local frequency from the center frequency of said discriminator and means for amplifying said control voltage and applying it to said electrode, a second frequency control loop for varying the center frequency of said discriminator in accordance with the deviation of said intermediate frequency from a predetermined value, and a third frequency control loop comprising a servo-amplifier having an input circuit connected to said discriminator for receiving said control voltage, and an output circuit connected to a motor mechanically coupled to said adjustable portion, said motor operating to adjust the tuning of said cavity in a manner to reduce said control voltage.

5. A frequency control apparatus for a radar system of the type including a transmitter, a superheterodyne receiver and an oscillator supplying said receiver with a voltage of a local frequency for converting signals of the transmitted frequency to an intermediate frequency, said oscillator comprising a velocity modulated tube having an electrode adapted to provide a fast-acting frequency control over a narrow range in response to signals applied thereto, and a tuning cavity containing an adjustable portion adapted to provide a slow-acting frequency control over a wide range, comprising a first frequency control loop having a tuneable discriminator connected to said oscillator for providing a control voltage proportional to the deviation of said local frequency from the center frequency of said discriminator and means for amplifying said control voltage and applying it to said electrode, a second frequency control loop for varying the center frequency of said discriminator in accordance with the deviation of said intermediate frequency from a predetermined value, and a third frequency control loop comprising a limiter, connected to said discriminator, for providing a signal when said control voltage exceeds a predetermined value, a servo-amplifier connected to said limiter and a motor operating from said servo-amplifier and mechanically coupled to said adjustable portion for adjusting the tuning of said cavity in a direction to reduce said control voltage, said limiter introducing a dead space in the operation of said third loop in order to prevent instability resulting from simultaneous operation of said third loop with said first loop.

6. A frequency control apparatus for a radar system of the type including a transmitter, a superheterodyne receiver and an oscillator supplying said receiver with a voltage of a local frequency for converting signals of the transmitted frequency to an intermediate frequency, said local oscillator comprising a velocity modulated electron discharge device having an electrode adapted to provide a fast-acting frequency control over a narrow range in response to signals applied thereto, and a tuning cavity containing an adjustable portion adapted to provide a slow-acting frequency control over a wide range, comprising a first frequency control loop having a tuneable discriminator connected to said oscillator for providing a control voltage varying in accordance with the deviation of said local frequency from the center frequency of said discriminator and means for amplifying said control voltage and applying it to said electrode, a second frequency control loop for varying the center frequency of said discriminator in accordance with the deviation of said intermediate frequency from a predetermined value, and a third frequency control loop comprising a limiter, connected to said discriminator, for providing a signal when said control voltage exceeds a predetermined value, a servo-amplifier connected to said limiter and a motor operating from said servo-amplifier and mechanically coupled to said adjustable portion for adjusting the tuning of said cavity in a direction to reduce said control voltage, said limiter introducing a dead space in the operation of said third loop in order to prevent instability resulting from simultaneous operation of said third loop with said first loop, and an adjustable source of bias voltage for said electrode, said source being linked to said motor in order to enable said third loop to adjust said bias voltage in a direction to obtain optimum oscillatory conditions in said device.

HARRY F. MAYER.

REFERENCES CITED

The following references are of record in the file of this patent:

UNITED STATES PATENTS

| Number | Name | Date |
|---|---|---|
| 2,425,013 | Stotz | Aug. 5, 1947 |
| 2,434,293 | Stearns | Jan. 13, 1948 |
| 2,434,294 | Ginzton | Jan. 13, 1948 |